United States Patent [19]

Ko

[11] Patent Number: 5,483,292

[45] Date of Patent: Jan. 9, 1996

[54] SYMBOL CLOCK REGENERATION IN DIGITAL SIGNAL RECEIVERS FOR RECOVERING DIGITAL DATA BURIED IN NTSC TV SIGNALS

[75] Inventor: Jung-Wan Ko, Suwon, Rep. of Korea

[73] Assignee: Samsung Electronics Co., Ltd., Kyungki-do, Rep. of Korea

[21] Appl. No.: 207,684

[22] Filed: Mar. 9, 1994

[51] Int. Cl.$^6$ .............................. H04N 7/56; H04N 7/64; H04N 5/04

[52] U.S. Cl. .......................... 348/537; 348/536; 348/518; 348/614; 348/572

[58] Field of Search ................................. 348/537, 539, 348/536, 540, 541, 546, 547, 548, 518, 519, 513, 512, 501, 500, 478, 468, 465, 572, 614, 620, 623, 665, 666, 667, 669, 670, 720, 435, 429, 471, 572, 573; 375/106; H04N 7/56, 7/54, 7/64, 7/66, 7/52, 7/24, 5/04

[56] References Cited

U.S. PATENT DOCUMENTS

| | | | |
|---|---|---|---|
| 4,222,073 | 9/1980 | Hirashima | 348/478 |
| 4,312,075 | 1/1982 | Murano et al. | 375/106 |
| 4,802,009 | 1/1989 | Hartmeier | 348/524 |
| 5,220,413 | 6/1993 | Jeong | 348/665 |
| 5,251,032 | 10/1993 | Heerkens | 348/537 |
| 5,331,416 | 7/1994 | Patel et al. | 348/614 |

FOREIGN PATENT DOCUMENTS

3068293  3/1991  Japan ........................ 348/572

*Primary Examiner*—Safet Metjahic
*Attorney, Agent, or Firm*—Sughrue, Mion, Zinn, Macpeak & Seas

[57] ABSTRACT

Digital data having a symbol rate that is a multiple of horizontal scan rate are buried in broadcast television signals. In a digital signal receiver the data are separated from composite video signal by quadrature video detection followed by comb filtering. The comb filtering is most economically realized by digital sampling at symbol rates. The regeneration of clocking signals at symbol rate, and at multiples of symbol rate where oversampling analog-to-digital conversion (ADC) techniques are employed, is done using a controlled oscillator with automatic frequency and phase control (AFPC) responding to the horizontal synchronizing pulses transmitted in the broadcast television signals. The horizontal synchronizing pulses are usually much larger than noise, so the controlled oscillator frequency and phase is rapidly adjusted following energization or channel change of the digital signal receiver. A fine adjustment of the phase of the oscillations from the controlled oscillator is made to minimize intersymbol error. This adjustment is made indirectly, by adjustably delaying the horizontal synchronizing pulses applied to the AFPC, so there is no discontinuity in the application of clocking signals to ADC circuitry and to comb filtering circuitry.

25 Claims, 4 Drawing Sheets

SYMBOL CLOCK REGENERATION IN DIGITAL SIGNAL RECEIVERS FOR RECOVERING DIGITAL DATA BURIED IN NTSC TV SIGNALS

The invention relates to receivers for recovering digital signals buried in analog television signals.

BACKGROUND OF THE INVENTION

Relatively low-power (e.g., 10 dB above noise floor) auxiliary signals encoding digital information can be admixed together with composite video signals without being objectionably evident in television pictures generated from those composite video signals, if suitable restrictions on the digital signal format are observed. It is advantageous to use a suppressed, vestigial-sideband, amplitude-modulated (VSB AM) carrier of the same frequency as the VSB AM picture carrier, but in quadrature phasing therewith, for transmitting the digital data. This procedure permits the synchronous detection of the modulation of that quadrature carrier to recover the digital data. If the bandwidth of the receiver is sufficient to include the entire vestigial sideband, remnant composite video signal accompanying the digital data as an interfering signal will not have substantial energy in the baseband extending up to 0.75 MHz in frequency. It is around 0.75 MHz that the VSB AM video carrier begins the transition from being a double-sideband amplitude-modulated (DSB AM) carrier to being a single-sideband amplitude-modulated (SSB AM) carrier, and at lessened energy up to the 1.25 MHz frequency at which roll-off of the vestigial sideband is complete.

A. L. R. Limberg, C. B. Patel and T. Liu in their U.S. patent application Ser. No. 08/108,311 filed 20 Aug. 1993, entitled APPARATUS FOR PROCESSING MODIFIED NTSC TELEVISION SIGNALS, WITH DIGITAL SIGNALS BURIED THEREWITHIN, and incorporated by reference herein describe phase-shift-keying (PSK) modulation of a subcarrier of the VSB AM carrier that is in quadrature phasing with the VSB AM video carrier of the same frequency. The frequency of their subcarrier is an odd multiple of one-half scan line frequency, and it is phase-shift-keyed in accordance with serial-bit digital data supplied at a symbol rate that is a multiple of scan line frequency. Limberg et alii prefer transmitting frames of the modulated subcarrier twice, but in opposite phasing in each successive pair of consecutive frames of the NTSC television signal. Because of frame-averaging effects resulting from the limitations on the speeds of the response of the human visual system and the decay of electroluminescence of kinescope phosphors, such repetition of data in pairs of frames makes PSK subcarrier accompanying the composite video signal detected from the NTSC television signal less visible in images that are generated from the composite video signal for viewing on a screen. Such repetition of data in pairs of frames also provides a basis for using frame-comb filtering in a digital signal receiver to separate PSK subcarrier from the luminance portion of the composite video signal that describes static portions of successive television images. Limberg et alii prefer also repeating the modulation of the digital data in antiphase in contiguous pairs of adjoining scan lines of the NTSC television signal, providing a basis for using line-comb filtering in the digital signal receiver to separate PSK subcarrier from the chrominance portion of the composite video signal.

Limberg et alii describe a digital signal receiver in which the synchronous video detector for quadrature-phase VSB AM video carrier is followed by a cascade connection of a lowpass line-comb filter and a highpass frame-comb filter. The lowpass line-comb filter is for separating the frequency spectrum of a PSK subcarrier having a frequency that is an odd multiple of half-scan-line frequency from chrominance signal portions of the frequency spectrum of an NTSC signal, particularly of an NTSC signal that has been appropriately pre-filtered. The highpass frame-comb filter is for separating the frequency spectrum of a PSK subcarrier having a frequency that is an odd multiple of half-scan-line frequency from motion-free luminance signal portions of the frequency spectrum of an NTSC signal. Limberg et alii teach that the remnant spectrum of the NTSC signal in the response of the cascaded highpass comb filters can be viewed as the frequency spectrum of a jamming signal accompanying the PSK signal. Accordingly, the remnant spectrum of the NTSC signal in the response of the cascaded highpass comb filters can be discriminated against by synchronous symbol detection.

U.S. patent application Ser. No. 08/141,070, filed 26 Oct. 1993 by J. Yang, entitled APPARATUS FOR PROCESSING NTSC TV SIGNALS HAVING DIGITAL SIGNALS ON QUADRATURE-PHASE VIDEO CARRIER and incorporated herein by reference, describes binary phase-shift-keyed (BPSK) modulation of a suppressed carrier that is the same frequency as a video carrier and is in quadrature phasing therewith. The suppressed carrier is phase-shift-keyed directly, without any subcarrier being used. Yang also advocates transmitting frames of the modulated subcarrier twice, but in opposite phasing in each successive pair of consecutive frames of the NTSC television signal, just as Limberg et alii do. Yang advocates the BPSK signals being constrained to about 2 MHz bandwidth, so as to avoid crosstalk into chroma in TV receivers that separate chroma from luma without recourse to comb filtering. Yang indicates a preference for passing the data to be transmitted through a pre-line-comb partial-response filter prior to its digital-to-analog conversion to an analog modulating signal for a balanced amplitude modulator. This is done to preserve the information contained therein when line-comb filtering is done in the digital signal receiver to separate PSK subcarrier from the luminance portion of the composite video signal. Line-comb filtering in the digital signal receiver converts the partial-response filtered binary digital signal to ternary digital signal, if the line-comb filtering is of the two-tap type, linearly combining signals differentially delayed by only the duration of one horizontal scan line of video signal. Line-comb filtering in the digital signal receiver converts the partial-response filtered binary digital signal to five-level digital signal, if the line-comb filtering is of the three-tap type, linearly combining signals differentially delayed by the duration of one horizontal scan line of video signal and by the duration of two horizontal scan lines of video signal. Therefore, multi-level symbol decision circuitry is required to recover bit-serial digital data transmitted by the BPSK from the comb filtering response.

U.S. patent application Ser. No. 08/179,616 filed 5 Jan. 1994 by J. Yang and A. L. R. Limberg, entitled "PRE-FRAME-COMB" AS WELL AS "PRE-LINE-COMB" PARTIAL-RESPONSE FILTERING OF BPSK BURIED IN A TV SIGNAL and incorporated herein by reference, describes the digital signal transmitter using a, pre-frame-comb partial-response filter as well as pre-line-comb partial-response filtering for processing bit-serial data from which BPSK modulating signal is generated for the carrier in quadrature phasing with the video carrier. Line-comb filtering in the digital signal receiver converts the partial-response filtered binary digital signal to five-level digital signal, if the line-comb filtering is of the two-tap type, linearly combining signals differentially delayed by only the duration of one horizontal scan line of video signal. Line-comb filtering in the digital signal receiver converts the partial-response filtered binary digital signal to nine-level digital signal, if the line-comb filtering is of the three-tap type, linearly combining signals differentially delayed by the duration of one horizontal scan line of video signal and by the duration of two horizontal scan lines of video signal.

U.S. patent application Ser. No. 08/179,588 filed 5 Jan. 1994 by J. Yang and A. L. R. Limberg, entitled APPARATUS FOR PROCESSING BPSK SIGNALS TRANSMITTED WITH NTSC TV ON QUADRATURE-PHASE VIDEO CARRIER, and incorporated herein by reference, describes BPSK modulating signal for the carrier in quadrature phasing with the video carrier being generated directly from bit-serial data without any pre-comb-filter partial-response filtering. The same patent application describes digital signal receivers, which use a cascade connection of a highpass frame-comb filter and a highpass line-comb filter after the quadrature video detector to suppress interfering remnant luminance signal, which use plural-level symbol decision circuitry for the comb filter response, and which use post-comb-filter partial-response filtering after the symbol decision circuitry for undoing the data alteration caused by the comb filtering.

Receivers for the Yang system are also described by T. V. Bolger in his U.S. patent application Ser. No. 08/141,071, filed 26 Oct. 1993, entitled RECEIVER WITH OVERSAMPLING ANALOG-TO-DIGITAL CONVERSION FOR DIGITAL SIGNALS WITHIN TV SIGNALS, and incorporated herein by reference. These receivers digitize the response of a quadrature-phase video detector using an oversampling analog-to-digital converter. The digitized quadrature-phase video detector response is subjected to digital frame-comb and line-comb filtering to suppress remnant composite video signals; the comb filtering response is supplied to multi-level symbol decision circuitry to recover bit-serial digital data transmitted by the BPSK; and the bit-serial digital data is supplied to a decoder that corrects the digital information in the data using forward-error-correcting codes contained therein.

Receivers for the Yang system are also described by J. Yang, T. V. Bolger and A. L. R. Limberg in their U.S. patent application Ser. No. 08/179,586 filed 5 Jan. 1994, entitled RECEIVER WITH SIGMA-DELTA ANALOG-TO-DIGITAL CONVERSION FOR DIGITAL SIGNALS BURIED IN TV SIGNALS, and incorporated herein by reference. These receivers digitize the response of a quadrature-phase video detector using an oversampling analog-to-digital converter of sigma-delta type. Preferably, the bit resolution of a basic multiple-bit-resolution flash converter is improved by using a sigma-delta procedure in which only a single bit of the basic multiple-bit-resolution ADC output signal is converted back to analog signal for feedback purposes during each oversampling step, as described by T. C. Leslie and B. Singh in their paper "An Improved Sigma-Delta Modulator Architecture", 1990 IEEE SYMPOSIUM ON CIRCUITS & SYSTEMS, 90 CH 2868-8900000-0372, pp. 372–375, incorporated herein by reference. The digitized quadrature-phase video detector response is subjected to digital frame-comb and line-comb filtering to suppress remnant composite video signals; the comb filtering response is supplied to multi-level symbol decision circuitry to recover bit-serial digital data transmitted by the BPSK; and the bit-serial digital data is supplied to a decoder that corrects the digital information in the data using forward-error-correcting codes contained therein.

U.S. patent application Ser. No. 08/179,618 filed 5 Jan. 1994 by C. B. Patel and J. Yang, and entitled APPARATUS FOR SUPPRESSING 30 GHOSTS IN SIGNALS MODULATING A CARRIER IN QUADRATURE PHASING WITH A VIDEO CARRIER, and incorporated herein by reference, describes the use of similar ghost-suppression filters for signals from in-phase and quadrature-phase video detectors in a digital signal receiver. The filtering coefficients of the two ghost-suppression filters are adjusted in parallel, responsive to calculations made from the in-phase video detector response to ghost-cancellation reference (GCR) signals broadcast during selected horizontal scan lines in the vertical blanking interval of the NTSC composite video signal.

The inventions described in the patent applications referred to above, like the inventions described herein, are assigned to Samsung Electronics Co., Ltd., pursuant to pre-existing employee agreement so to assign inventions made within the scope of employment. Certain modifications to the systems described in these applications have been subsequently considered. As originally described these systems include data in all horizontal scan lines, including all horizontal scan lines in the vertical blanking interval, and data frames are started after the vertical sync pulse interval. Alternatively, data frames can begin with the $22^{nd}$ horizontal scan line of each odd field of composite video signal with data not being transmitted during the $18^{th}$ through $21^{st}$ lines of each field of composite video signal. This practice avoids any changes with regard to the $19^{th}$ lines being used for ghost cancellation reference (GCR) signals, the $20^{th}$ lines being used for video facsimile transmissions, and the $21^{st}$ lines being used for closed caption information.

The bandwidths available from the systems described in the patent applications referred to above accommodate the transmission of 5.1-channel Dolby AC-3 audio or MPEG audio.

A previous preference was to use the −20-1RE-level midpoints in edges (usually the leading ones) of the horizontal sync pulses as the leftmost edge of the first pixel in each horizontal scan line and to reckon all pixel clocking from those points. A problem that arises when considering reference points for data symbol clocking is that the NTSC television standards do not specify close tolerances on the time relationships between horizontal sync pulse edges, color burst and GCR signals. Since in the digital-signal receiver the GCR signal is stored on a point-by-point basis in read-only memory (ROM), for use by the processor used for calculating adjustments of the weighting coefficients of ghost-suppression filtering, preferable transmitter practice is to refer the transmitted GCR signal and the transmitted symbol clock to each other. Then, the ghost-suppression filtering in the digital-signal receiver can automatically provide for the adjustment of symbol clocking phase, as the processor seeks to cross-correlate the GCR signal received from the transmitter with the GCR signal stored in its ROM. This practice is also preferable from the standpoint that the transmitted GCR signal is usually locally generated at the transmitter and so does not depend on remotely originated composite video, which may have the timing relationships between horizontal sync and color subcarrier altered by differential phase distortion.

In a digital signal receiver for receiving digital signals buried in conventional analog television signals, there are advantages to detecting the composite video signal modulating the amplitude of the VSB video carrier using an in-phase video detector, in addition to a quadrature-phase video detector for recovering digital information. The synchronizing pulses for the composite video signal contain a large amount of useful timing information, which can be used to define data frames, data rows, and approximate PSK symbol positions. This timing information can also be used for controlling frame-comb and line-comb filtering of the signal detected by the quadrature-phase video detector, in order to suppress interfering remnants of the composite video signal. These remnants are above the 0.75 MHz frequency where the VSB AM video carrier begins the transition from being a double-sideband amplitude-modulated (DSB AM) carrier to being a single-sideband amplitude-modulated (SSB AM) carrier, exhibiting increased energy up to the 1.25 MHz frequency at which roll-off of the vestigial sideband is complete. The ghost cancellation reference (GCR) signals transmitted in the $19^{th}$ scan line of each field provide information concerning a modulo-8 field (or half-frame) count that is useful in relating frames of data to each other. Since an in-phase video detector is advantageously included in a digital signal receiver, anyway, the GCR signals it detects from the $19^{th}$ scan line of each field are available as a basis for calculating multipaths in the transmission channel.

The bit rate for the BPSK has to be a multiple of horizontal scanning frequency in order to implement partial-response filtering, done either at the transmitter or in the digital signal receiver, and to implement the separation of the BPSK from composite video signal by line- and frame-comb filtering in the digital signal receiver. The digital transmissions accompanying the television signals differ from ordinary digital transmissions, then, in that the accompanying television signals are relatively high energy signals sharing the same channel that tend to be jamming signals for the digital transmissions and so to interfere with recovery of the BPSK carrier. But at the same time, these strong interfering television signals contain timing information in their synchronizing pulses that is related to the frequency and phase of the BPSK carrier. Accordingly, it is advantageous to use the horizontal synchronizing pulses as input signal for the automatic frequency and phase control (AFPC) circuitry of a controlled oscillator used in the regeneration of clocking signals in the digital-signal receiver. Further, the GCR signals included in the $19^{th}$ scan lines of the image fields of these strong interfering television signals provide the best reference signals for channel equalization purposes.

SUMMARY OF THE INVENTION

Digital data having a symbol rate that is a multiple of horizontal scan line rate are buried in broadcast television signals. In a digital signal receiver the data are separated from composite video signal by quadrature video detection followed by comb filtering. The comb filtering is most economically realized by digital sampling at symbol rates. The regeneration of clocking signals at symbol rate, and at multiples of symbol rate where oversampling analog-to-digital conversion techniques are employed, is done using a controlled oscillator with automatic frequency and phase control responding to the horizontal synchronizing pulses transmitted in the broadcast television signals. The horizontal synchronizing pulses are usually much larger than noise, so the controlled oscillator frequency and phase is rapidly adjusted following energization or channel change of the digital signal receiver. A fine adjustment of the phase of the oscillations from the controlled oscillator can be subsequently made to facilitate ghost-suppression filtering procedures. This adjustment is made indirectly, by adjustably delaying the horizontal synchronizing pulses applied to the AFPC, so there is no discontinuity in the application of clocking signals to ADC circuitry and to comb filtering circuitry.

DETAILED DESCRIPTION

Figure 1:
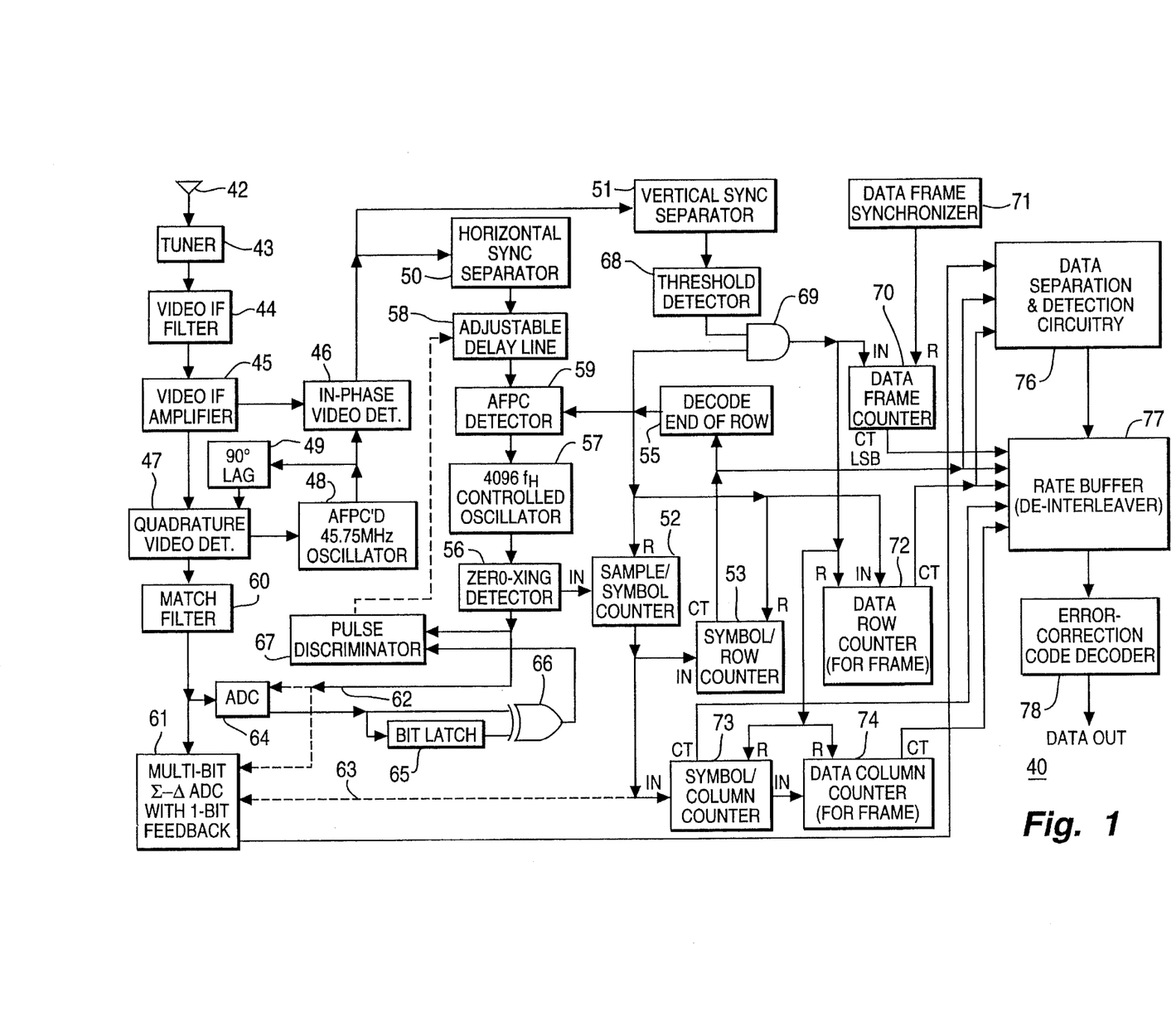
FIG. 1 is a schematic diagram of a digital signal receiver for receiving a television signal with a digital signal buried therewithin and extracting the buried digital signal, which digital signal receiver includes clock signal regeneration circuitry that embodies the invention.

FIG. 1 shows a digital-signal receiver 40 for receiving, from means such as an antenna 42, a television signal with a digital signal buried therewithin and extracting the buried digital signal. The digital-signal receiver 40 can be any one of the types described in the "Background of the Invention". A tuner 43 selects the television channel to be detected by the first detector therein, which first detector is a tunable downconverter, conventionally of superheterodyne type, for converting the selected television signal to a set of intermediate frequencies and an image set of frequencies. A video intermediate-frequency (IF) filter 44 selects the video intermediate frequencies for application as input signal to an intermediate-frequency (IF) amplifier 45 and rejects the image set of frequencies. Following the current custom a surface-acoustic-wave (SAW) filter can be used for the video IF filter 44 and to construct the video IF amplifier 45 within a monolithic integrated circuit (IC), as a multi-stage amplifier without interstage tuning. The video IF amplifier 45 supplies the amplified video IF signal to an in-phase synchronous video detector 46 and to a quadrature-phase synchronous video detector 47. An oscillator 48 oscillating with a nominal IF video carrier frequency of 45.75 MHz supplies its oscillations to the in-phase synchronous video detector 46 without phase shift and to a quadrature-phase synchronous video detector 47 with 90° lagging phase shift provided by a shift network 49. The oscillator 48 has automatic frequency and phase control (AFPC) responding to the output signal of the quadrature-phase synchronous video detector 47. The synchronous video detectors 46 and 47 are customarily included together with the video IF amplifier 45 and portions of the oscillator 48 within the IC. Each of the video detectors 46 and 47 may either be of exalted carrier type or of true synchronous type. In-phase modified composite video signal recovered by the in-phase synchronous video detector 46 is supplied to a horizontal sync separator 50 and to a vertical sync separator 51, which recover horizontal and vertical synchronizing pulses from the in-phase modified composite video signal, respectively.

The aspects of the digital-signal receiver 40 thusfar considered are generally familiar to persons skilled in the art of TV receiver design, although the video IF filter 44 is preferably made only about 3.5 MHz wide and is centered at about 45.25 MHz. This video IF filter 44 provides both in-channel and adjacent-channel sound rejection without need for sound trap filtering after the quadrature-phase video detector 47. This video IF filter 44 also suppresses chrominance components of the video signal detected by the in-phase video detector 46 and of the remnant composite video signal detected by the quadrature-phase video detector 47. The bandwidth of the quadrature-phase video detector 47 should be somewhat wider than symbol rate, so as not to attenuate the upper frequencies in the "tail" of BPSK response. The quadrature-phase video detector 47 detects the keying signal, accompanied by only those portions of the NTSC composite video signals at frequencies above 750 kHz.

Figure 2:
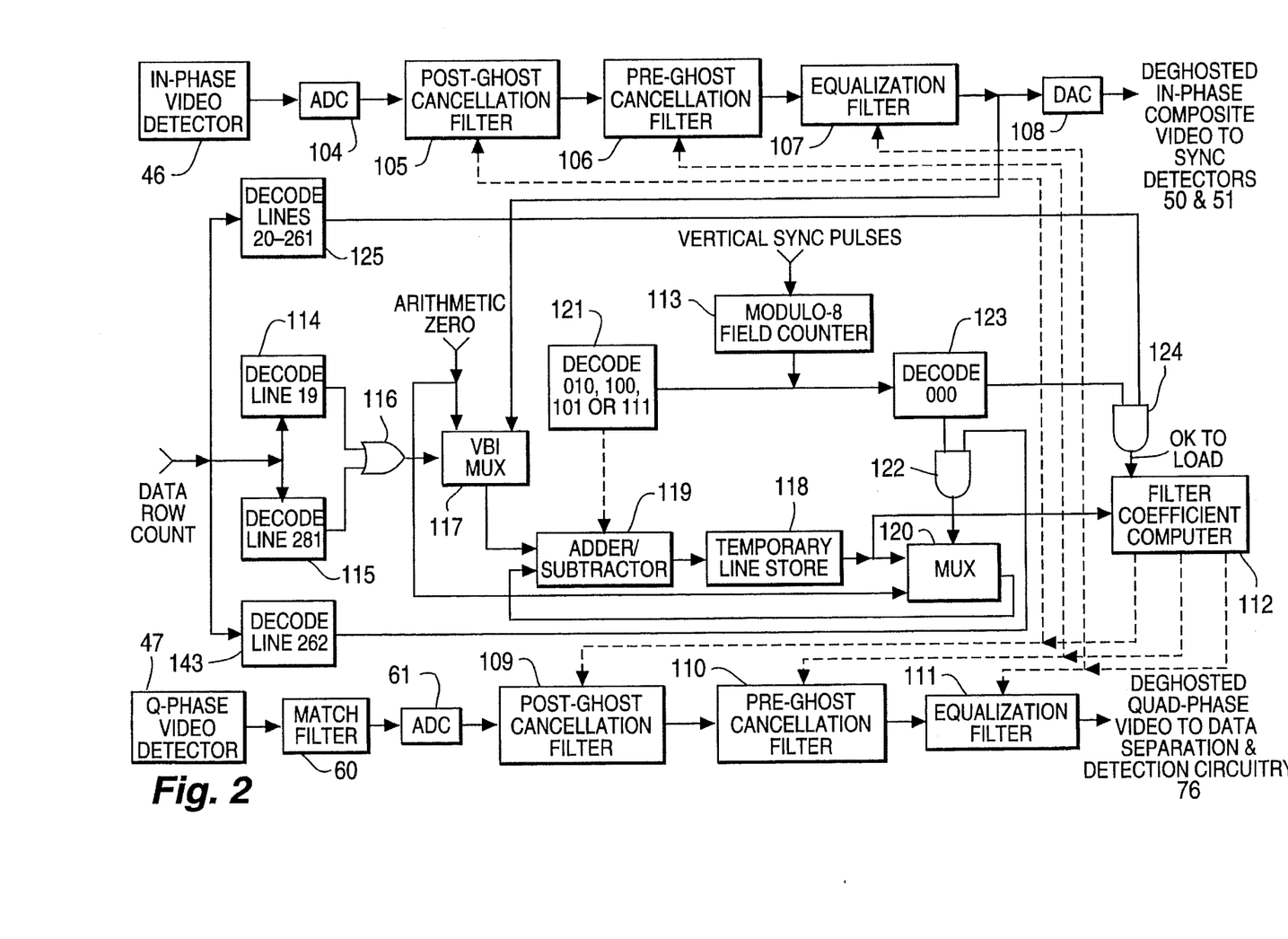
FIG. 2 is a schematic diagram of ghost-suppression circuitry to be included in the FIG. 1 digital signal receiver.

In practice the digital signal receiver 40 usually will include ghost suppression circuitry, which is not separately and explicitly shown in FIG. 1, but is described in detail further on in this specification with reference to FIG. 2 of the drawing. Each of the in-phase and quadrature-phase video detectors 46 and 47 includes, after its synchronous detector per se, respective ghost cancellation and equalization filters similar to those used after the synchronous detector per se included in the other video detector. The adjustable parameters of the two ghost-cancellation filters are adjusted in parallel responsive to calculations made in a computer, and the adjustable parameters of the two equalization filters are also adjusted in parallel responsive to further calculations made in the computer. Ghost-cancellation reference (GCR) signals, which extend up to 4.1 MHz in frequency when transmitted, but extend to only 2.5 MHz or so in a digital signal receiver because of its limited IF bandwidth, are extracted from selected vertical-blanking-interval (VBI) scan lines of the video signal detected by the in-phase synchronous video detector 46. The GCR signals are digitized and supplied as input signal to the computer for calculating the adjustable parameters of the ghost-cancellation and equalization filters. Alternatively or additionally, direct-current or low-frequency components in the quadrature-phase video detector 47 response can be sensed and used as a basis for calculating the adjustable parameters of the ghost-cancellation filters.

In the FIG. 1 digital-signal receiver 40, a SAMPLE-PER-SYMBOL COUNT signal is generated by a sample-per-symbol counter 52 counting pulses generated by a zero-crossing detector 56 in response to sinusoidal oscillations received from a voltage-controlled oscillator 57. The sample-per-symbol counter 52 has four stages and supplies an overflow carry each sixteenth average-axis crossing of the oscillator 57 oscillations. A SYMBOL COUNT signal is generated by a symbol counter 53 counting overflow carries from the sample-per-symbol counter 52. A decoder 55 decodes the SYMBOL COUNT reaching 255 to generate a pulse that resets the counters 52 and 53 on the next pulse supplied to the counter 52 by the zero-crossing detector 56, returning both SAMPLE-PER-SYMBOL COUNT and SYMBOL COUNT to arithmetic zero. The pulses generated by the decoder 55 are supplied to an AFPC detector 59 to be compared to the horizontal sync pulses H separated by the horizontal sync separator 50 and adjustably delayed for fractions of a symbol interval by a controlled delay line 57. The results of the comparison are lowpass filtered within the AFPC detector 59 to generate an automatic frequency and phase control (AFPC) voltage signal for application to the VCO 57. These arrangements control the frequency of the oscillations supplied from the line-locked VCO 57 to be 16×256=4,096 times the horizontal scan line frequency $f_H$, or 64,447,545 Hz. The term "line-locked" used in reference to a controlled oscillator means that the frequency of its oscillations is maintained in constant ratio to the 15,734.264 Hz scan line frequency. This is customarily done by AFPC circuitry comparing the frequency of its oscillations, as divided by a suitable factor, to horizontal synchronizing pulses.

The keying signal and accompanying portions of the NTSC composite video signals at frequencies above 750 kHz detected by the quadrature-phase video detector 47 are supplied to a match filter 60, which responds to the keying signal but only selected portions of the accompanying above-750-kHz frequency components of composite video signal. The match filter 60 provides a peaking response that matches with the roll-off of a transition-shaping filter in the transmitter to extend PSK bandwidth enough to reduce inter-symbol interference. The response from the match filter 60 is applied as input signal to an analog-to-digital converter (ADC) 61, which is preferably of an oversampling type. The quadrature-phase video detector 47 recovers substantially no composite video signal frequencies below 750 kHz and the BPSK coding is such that it has no zero-frequency content. During the transmission of TV images without much energy in the frequencies above 750 kHz, the BPSK portion of the quadrature-phase synchronous video detector 47 response will alternate from one polarity to the other. So the ADC 61 is of a type capable of digitizing analog signal of either positive or negative polarity. More particularly, the ADC 61 is preferably a multi-bit sigma-delta converter with single-bit feedback, as described by T. C. Leslie and B. Singh in their paper "An Improved Sigma-Delta Modulator Architecture", 1990 IEEE SYMPOSIUM ON CIRCUITS & SYSTEMS, 90 CH 2868-8900000-0372, pp. 372–375. A flash converter with 8-bit resolution (which is of modest price) samples the error signal in a second-order sigma-delta feedback loop, and single-bit feedback is used to minimize digital-to-analog conversion errors. The second-order sigma-delta feedback loop is unconditionally stable. The error signal is sampled, by way of specific example, at sixteen times the symbol rate of 256 times horizontal scan line rate $f_H$ for a 16:1 oversampling ratio, sampling each time a pulse is received over a line 62 from the zero-crossing detector 56 each time it detects the oscillations from the oscillator 57 crossing average axis in a prescribed direction. The digital output of the flash converter is supplied to an FIR lowpass filter within the converter 61, and the digital response of this filter is subsampled 16:1 by a subsampler sampling each time a pulse is received over a line 63 from the carry overflow of the sample-per-symbol counter 52. This decimation reduces the amount of storage capability required in the delay portions of the digital comb-filtering to follow. Subsampling at symbol rate, with optimal phasing, is a form of synchronous symbol detection which suppresses response to those components of the composite video signal that exhibit change at symbol rate, but are in quadrature phasing with the sampling at symbol rate. The lowpass filter preceding the subsampler suppresses the chrominance signal frequencies.

A single-bit ADC 64, sampling responsive to pulses supplied by the zero-crossing detector 56 on the line 62, responds to the match filter 60 response to supply a sign bit descriptive of the polarity of the match filter 60 response. That sign bit and that sign bit as delayed by one sample count in a bit latch 65 are supplied as respective inputs to an exclusive-OR gate 66. The XOR gate 66 detects match filter 60 response, supplying the results of this detection to a pulse phase discriminator 67. The pulse phase discriminator 67 selectively detects departures of the zero-crossings of the match filter 60 response, as detected by the XOR gate 66, from proper phasing respective to the zero-crossings of the oscillations of the controlled oscillator 57, as detected by the zero-crossing detector 56. The pulse phase discriminator 67 lowpass filters these selectively detected departures, as sampled and held, thereby to generate a control signal for adjusting the delay the controlled delay line 58 provides for the horizontal sync pulses H applied to the AFPC detector 59. This selective detection by the pulse phase discriminator 67 can be done during portions of the vertical blanking interval when the response of quadrature-phase video detector 47 to composite video signals is expected to be zero-valued. The phasing of the oversampling by the flash converter in the ADC 61 during its digitization of second-order sigma-delta error signal is accordingly adjusted for minimal inter-symbol interference. This reduces the correction of symbol rate clocking phase that must be provided by the equalization filters 107 and 111, which allows filters with fewer taps to provide adequate equalization.

The AFPC loop controlling the frequency and phasing of the oscillations of the controlled oscillator 57 with respect to the adjustably delayed horizontal sync pulses H supplied from the controlled delay line 57 provides a filtering function that avoids the ADC clocking exhibiting a "glitch" or pronounced shortening of periodicity during phase adjustment. Such glitches occur at times if fine phase adjustment is attempted in the ADC clocking itself.

The vertical sync separator 51 supplies "lossy" integrated response to separated vertical sync pulses V to a threshold detector 68, the threshold voltage of which is chosen such that it is exceeded only when the vertical sync pulses are integrated over more than five half scan lines and less than seven half scan lines. The threshold detector 68 output signal, which is a ONE only when its input signal exceeds its threshold voltage and is otherwise a ZERO is supplied as a first input signal to a two-input AND gate 69. The decoder 55 generates a ONE for the final value of SYMBOL COUNT in each data row (at the finishes of horizontal scan lines) and otherwise generates a ZERO. The decoder 55 supplies its output signal to the AND gate 69 as a second input signal thereto. The AND gate 69 is responsive to the trailing edges of vertical pulses that occur at the beginning of the initial fields of composite video signal frames, to provide a respective DATA-FRAME-END pulse responsive to each of these edges, but is not responsive to the trailing edges of vertical pulses that occur between respective initial and final fields of frames. The DATA-FRAME-END pulses in the AND gate 69 response are supplied to a modulo-2 data frame counter 70 as count input (CI) signal, so as to advance a regenerated DATA FRAME COUNT signal, which is offset by one scan line from the DATA FRAME COUNT signal at the transmitter. A frame synchronizer 71 for resetting the data frame counter 70 will be described in detail further on in this specification, with reference to FIG. 3 of the drawing.

The DATA-FRAME-END pulses in the AND gate 69 response are also applied as a reset (R) signal to a data row counter 72 to reset the DATA ROW COUNT regenerated as its output signal, which should then be 524, to arithmetic zero. The data row counter 72 is connected to count the end-of-row pulses supplied from the decoder 55, which are more reliable in their occurrence than the horizontal sync pulses H supplied from the horizontal sync separator 50. The DATA ROW COUNT is used to control the selection of the VBI scan lines containing GCR signals in the circuitry (not explicitly shown in FIG. 1) for acquiring data for the computer (also not explicitly shown in FIG. 1) that calculates the adjustable filtering parameters for the equalization and ghost-cancellation filters included within the video detectors 46 and 47.

Data separation and detection circuitry 76 receives the digital response of the ADC 61 as input signal. Particular embodiments of the data separation and detection circuitry 76 are described in the patent applications referred to in the "Background of the Invention". The data separation and detection circuitry 76 supplies a bit-serial digital output signal. Assuming that the PSK signal transmitted during each odd-numbered data frame is repeated in opposite sense of modulation during the next even-numbered data frame, a rate buffer 77 will be written to every other data frame with the bit-serial digital output signal supplied from the circuitry 76 at PSK symbol rate. The rate buffer 77 will be read from continuously, to supply its own bit-serial digital output signal at one-half PSK symbol rate to an error-correction code decoder 78. Decoder 78 converts its serial-bit digital input data to parallel-bit form and corrects the errors therein to provide corrected digital data, which are the output data of the digital signal receiver 40.

Preferably, the forward error-correction code is a modified Reed-Solomon type and the digital signal is interleaved data frame by data frame before conversion to PSK. In such case the rate buffer 77 includes two frame stores therewithin and is operated as a de-interleaver. The rate buffer 77 is conditioned by the more-significant bit of the DATA FRAME COUNT to write different ones of two frame stores therewithin on alternate ones of data frame pairs and to read the one of these of two frame stores not selected for writing. The less-significant bit of the DATA FRAME COUNT determines when the valid data frame in each data frame pair is written into the rate buffer 77 operated as a de-interleaver. The write addresses for the frame store the more-significant bit of the DATA FRAME COUNT selects for writing is formed from the DATA ROW COUNT supplied by the counter 72 and from the SYMBOL-PER-DATA-ROW COUNT supplied by the counter 53. The carry overflow pulses from the sample-per-symbol counter 52 are counted by a symbol-per-column counter 73 to generate a SYMBOL-PER-COLUMN COUNT; and the carry overflow pulses from the symbol-per-column counter 73 are counted by a data column counter 74 to generate a DATA COLUMN COUNT. The counters 73 and 74 are reset to initial count at the beginning of each data frame by the AND gate 69 response going to ONE. The DATA COLUMN COUNT and the SYMBOL-PER-COLUMN COUNT together provide the read addressing for the frame store in the rate buffer 77 operated as a de-interleaver that the more-significant bit of the DATA FRAME COUNT selects for reading de-interleaved serial-bit data to the error-correction code decoder 78.

FIG. 2 shows representative ghost-suppression circuitry for inclusion in the FIG. 1 digital signal receiver, which ghost-suppression circuitry is designed to utilize the ghost-cancellation reference (GCR) signals that are the de facto standard for television broadcasting in the United States of America. Bessel pulse chirp signals are inserted into the first halves of selected VBI lines, the $19^{th}$ line of each field currently being preferred. The distribution of energy in the Bessel pulse chirp signal has a flat frequency spectrum extending continuously across the video frequency band. The chirp starts at the lowest frequency and sweeps upward in frequency therefrom to the 4.1 MHz highest frequency. The chirps, which are on +30 IRE pedestals, swing from −10 to +70 IRE and begin at a prescribed time after the trailing edges of the preceding horizontal synchronizing pulses. The chirp signals appear in an eight-field cycle in which the first, third, fifth and seventh fields have a polarity of color burst defined as being positive and the second, fourth, sixth and eighth fields have an opposite polarity of color burst defined as being negative. The initial lobe of a chirp signal ETP that appears in the first, third, sixth and eighth fields of an eight-field cycle swings upward from the +30 IRE pedestal to +70 IRE level. The initial lobe of a chirp signal ETR that appears in the second, fourth, fifth and seventh fields of the eight- field cycle swings downward from the +30 IRE pedestal to −10 IRE level and is the complement of the ETP chirp signal.

The strategy for eliminating ghosts in the television receiver relies on the transmitted GCR signal suffering the same multipath distortions as the rest of the television signal. Circuitry in the receiver can then examine the distorted GCR signal received and, with a priori knowledge of the distortion-free GCR signal, can configure an adaptive filter to cancel, or at least significantly attenuate, the multipath distortion. A GCR signal should not take up too much time in the VBI (preferably no more than one TV line), but should still contain sufficient information to permit circuitry in the receiver to analyze the multipath distortion and configure a compensating filter to cancel the distortion. The GCR signals are used in the television receiver for calculating the adjustable weighting coefficients of a ghost-cancellation filter through which the composite video signal from the video detector is passed to supply a response in which ghosts are suppressed. The weighting coefficients of this ghost-cancellation filter are adjusted so it has a filter characteristic complementary to that of the transmission medium giving rise to the ghosts. The GCR signals can be further used for calculating the adjustable weighting coefficients of an equalization filter connected in cascade with the ghost-cancellation filter, for providing an essentially flat frequency spectrum response (or other preferred frequency spectrum response) over the complete reception path through the transmitter vestigial-sideband amplitude-modulator, the reception medium, the television receiver front-end and the cascaded ghost-cancellation and equalization filters.

Figure 3:
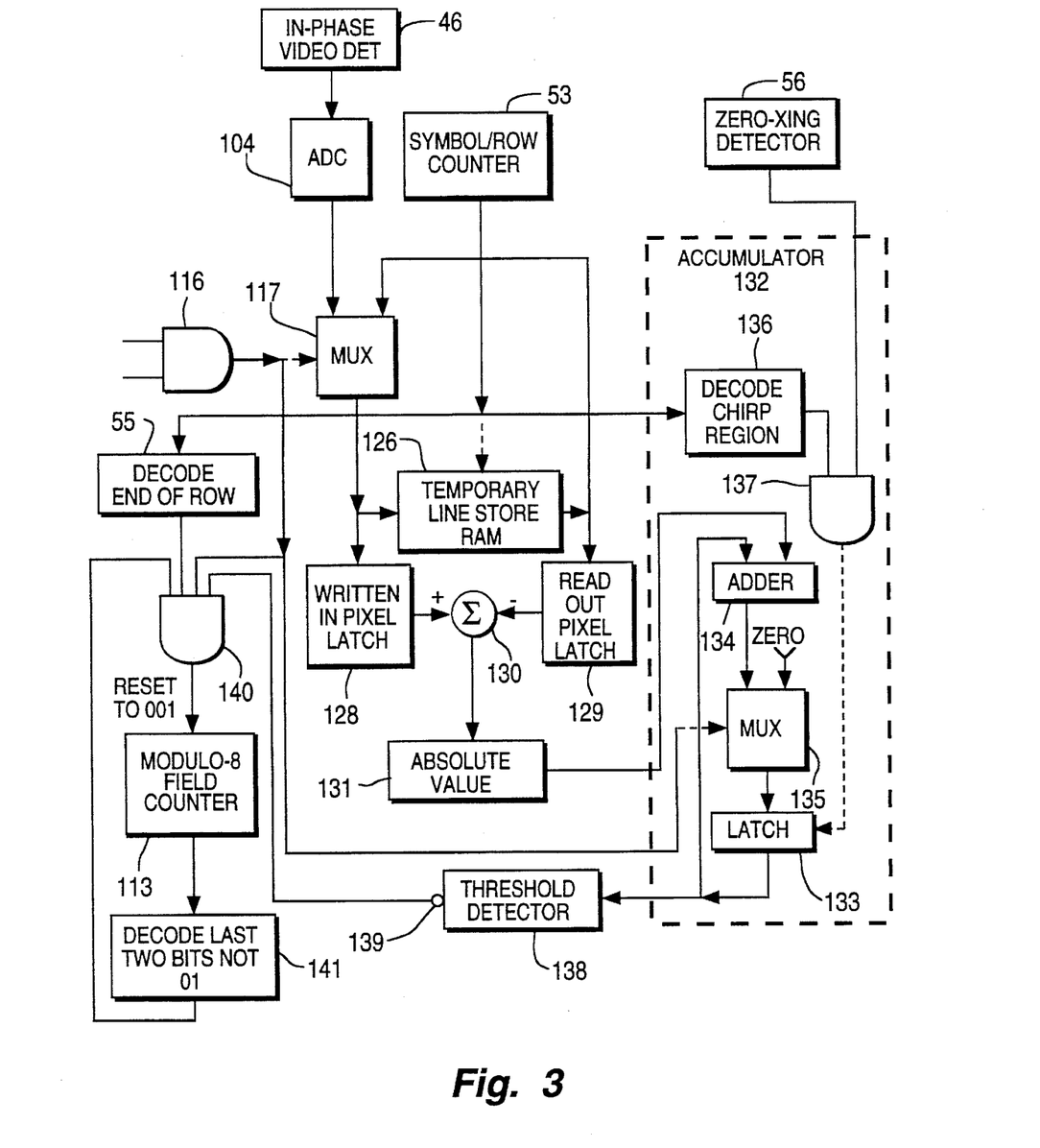
FIG. 3 is a schematic diagram of circuitry for resetting a modulo-eight field counter in the FIG. 2 ghost-suppression circuitry.

The ghost suppression circuitry described with reference to FIGS. 2 and 3 is suitable for a digital signal receiver in which the video IF filter 45 rejects the adjacent channel with next higher channel number. The Bessel pulse chirp component of each GCR signal has a flat frequency spectrum extending continuously across the video frequency band, with the chirp starting at the lowest frequency and sweeping upward in frequency therefrom to the 4.1 MHz highest frequency. In preferred designs the lower cut-off frequency of the video IF filter 44 is high enough in frequency to roll-off, beyond 2 MHz or so, the Bessel pulse chirp component of each GCR signal as detected by the in-phase video detector 46.

In FIG. 2 the composite video signal and PSK subcarrier remnants buried therein that are detected by the in-phase video detector 46 are digitized by an analog-to-digital converter 104, similar in construction and operation to the ADC 61 described above with reference to FIG. 1. In FIG. 2 the ADC 104 supplies the digitized in-phase composite video signal with PSK remnants buried therewithin as input signal to a cascade connection of a post-ghost cancellation filter 105, which is an adaptive filter of IIR type; a pre-ghost cancellation filter 106, which is an adaptive filter of FIR type; and an equalization filter 107, which is an adaptive filter of FIR type. The response of the equalization filter 107 is converted back to analog form by a digital-to-analog converter 108 for application to the horizontal sync separator 50 and the vertical sync separator 51 of the FIG. 1 digital signal receiver.

In FIG. 2, as in FIG. 1, the PSK subcarrier and the upper frequencies of the composite video signal that are detected by the quadrature-phase video detector 47 and filtered by the match filter 60 are digitized by an analog-to-digital converter 61. The output signal from the ADC 60 is applied as input signal to a cascade connection of a post-ghost cancellation filter 109, which is similar to the post-ghost cancellation filter 105; a pre-ghost cancellation filter 110, which is similar to the pre-ghost cancellation filter 106; and an equalization filter 111, which is similar to the equalization filter 107. The response of the equalization filter 111 is supplied to the data separation and detection circuitry 76 of FIG. 1 as input signal.

A filter-coefficient computer 112 computes the weighting coefficients for the adaptive filters 105–107 and 109–111. These weighting coefficients are binary numbers, which the filter-coefficient computer 112 writes into registers within the digital filters 105–107 and 109–111. In the IIR filters 105 and 109 the weighting coefficients stored in registers thereof are used as multiplier signals for digital multipliers receiving the filter output signal with various amounts of delay as multiplicand signals. The product signals from the digital multipliers are combined algebraically in digital adder/subtractor circuitry to generate the IIR filter response. In each of the FIR filters 106, 107, 110 and 111 the weighting coefficients stored in registers thereof are used as multiplier signals for digital multipliers receiving the filter input signal with various amounts of delay as multiplicand signals. In each of the FIR filters 106, 107, 110 and 111 the product signals from the digital multipliers are combined algebraically in digital adder/subtractor circuitry to generate the weighted summation response characteristic of an FIR filter.

The number of taps in the FIR filters 106, 107, 110 and 111 depends on the range over which ghost suppression is sought. To keep filter costs within commercial constraints, typically the FIR filters 106 and 110 each have around 64 taps for suppressing ghosts with as much as 6 microseconds displacement from the direct signal. The FIR filters 107 and 111 used for frequency equalization each need only have 32 taps or so. The FIR filters 107 and 111 are typically required to correct in-band video response that can be rolled off by as much as 20 dB at 3.6 MHz, but roll-off at 3.6 MHz is usually less than 10 dB. The roll-off is usually attributable to incorrect orientation of the antenna in off-the-air reception. The cascaded FIR filters 106 and 107 are replaced in some designs by a single FIR filter having about 80 taps, as are the cascaded FIR filters 110 and 111.

The IIR post-ghost cancellation filters 105 and 109 required for suppressing post-ghosts over the full range of 40 microseconds displacement from the direct signal can each be as many as 600 taps long. However, since post-ghosts usually are non-overlapping and occur at discrete displacements, the weighting coefficients for many of these taps of the filters 105 and 109 are zero-valued or nearly so. Each of the tapped delay lines in the IIR filters 105 and 109 is usually designed as a cascade connection of ten-tap-or-so delay lines interspersed with programmable "bulk" delay devices, making each of the filters 105 and 109 what is sometimes termed a "sparse-weighting" filter. The ten-tap-or-so delay lines furnish signals to the digital multipliers for weighting. The incremental delay between successive taps of each of these ten-tap-or-so delay lines is a single half-symbol interval. The programmable bulk delay devices each comprise various length delay lines the chaining together of which can be controlled in response to control signals expressed as binary numbers. Such a sparse-weighting filter will include registers for the binary numbers specifying the delays of the programmable delay devices, the contents of which registers are also controlled by the filter-coefficient computer 112.

The IIR filters 105 and 109 can be included in an integrated device where the same set of registers stores weighting coefficients and bulk delay programming information for both filters. The FIR filters 106 and 110 can be included in an integrated device where the same set of registers stores weighting coefficients for both filters. The FIR filters 107 and 111 can be included in an integrated device where the same set of registers stores weighting coefficients for both filters.

In FIG. 2 the vertical sync pulses separated by the vertical sync separator 51 are counted modulo-8 by a three-stage field counter 113, which generates a MODULO-8 FIELD COUNT. Two stages of this three-stage field counter 113 are the data frame counter 70 of FIG. 1. The first stage of counter 113 generates a count corresponding to the MODULO-2 DATA FRAME PAIR COUNT, used by the rate buffer 77 of FIG. 1 for selecting which of two framestores therein is to be written to and which is to be read from. The middle stage of counter 113 generates a count corresponding to the MODULO-2 DATA FRAME COUNT, used by the rate buffer 77 of FIG. 1 as a further write enable signal for the one of the two framestores therein selected to be written to. The MODULO-8 FIELD COUNT, the SYMBOL-PER-DATA-ROW COUNT from the counter 53, and the DATA ROW COUNT from the counter 64 are available to the filter-coefficient computer 112 for use in timing its operations, although connections for furnishing these counts to the computer 112 are omitted from FIG. 2 to reduce its complexity. Decoders 114 and 115 respond to the DATA ROW COUNTs corresponding to video signal line counts being 19 and 251, respectively, to supply ONEs to an OR gate 116. The OR gate 116 responds to supply a ONE during the scan line in each vertical blanking interval containing GCR signal, to condition the output signal of a multiplexer 117 to correspond to the digitized composite video signal from the output of the cascade connection of filters 105, 106 and 107 supplied as a first input signal thereto, rather than to a wired zero supplied as a zeroeth input signal thereto.

The filter-coefficient computer 112 has control over the operating parameters of the filters 105–107 and the similar operating parameters of the filters 109–111. So, by manipulation of the operating parameters of the filters 105–107 the computer 112 can select the point in the cascade connection of these filters from which GCR signal is separated by the GCR signal separator comprising the elements 114–117. For example, the input signal applied to the cascade connection of the filters 105–107 can be selected to the GCR signal separator by the computer 112, by setting the weighting coefficients of the recursive paths in the IIR filter 105 to zero values, so the output response of the IIR filter 105 corresponds to its input signal; by setting to zero all the weighting coefficients except a unity-valued one defining the kernel center in the FIR filter 106; and by setting to zero all the weighting coefficients except a unity-valued one defining the kernel center in the FIR filter 107. Extracting the GCR signals at the output of the de-ghosting filter permits "closed-loop" de-ghosting procedures to be implemented. Alternatively, one can make circuit arrangements that will implement more direct and faster selection of the point in the cascade connection of the filters 105–107 from which GCR signal is separated.

In FIG. 2 a temporary (scan) line store 118 is provided by a random-access memory (RAM) arranged for read-then-write-over operation as each of its storage locations is sequentially addressed in accordance with the SYMBOL-PER-DATA-ROW COUNT. These same addresses are supplied to the filter-coefficient computer 112 to be used to address a line storage register therein when separated GCR signal is transfered thereto from the temporary line store 118. The temporary line store 118 is connected in an arrangement for accumulating the $19^{th}$-VBI-line GCR signals on a per pixel basis for eight successive fields, in a temporal filtering operation that separates the Bessel-chirp information from other information occurring during those $19^{th}$ VBI scan lines.

Elements 113–123 in the FIG. 2 circuitry combine to form a GCR-signal averaging filter that carries out this lowpass temporal filtering operation, which correlates the Bessel-chirp information occurring during those $19^{th}$ VBI scan lines to provide improved signal-to-noise ratio, as compared to using gating simply to separate the Bessel-chirp information from $19^{th}$ VBI scan lines as it occurs. When the corresponding pixels of the eight GCR signals have been accumulated during the $19^{th}$ line of FIELD 000, the eighth and last field of the eight-field sequence, the separated Bessel-chirp information is serially loaded one pixel at a time into a register of the filter-coefficient computer 112 during any line of FIELD 000 when DATA ROW COUNT corresponds to a video signal line count that is in the range from 20 to 261, inclusive, as determined by a decoder 125. In FIG. 2 the line store 118 is cleared of data during the last line of the last field of the eight-field sequence, when a decoder 143 determines that DATA ROW COUNT corresponds to a video signal line count that is 262.

The temporary line store 118 has to have the capability of storing sixteen-parallel-bit samples, assuming that it is to accumulate on a signed basis eight lines of 8-parallel-bit samples of digitized composite video signal supplied from the ADC 104 via the cascaded filters 105–107. The signed arithmetic is preferably two's complement arithmetic. In partial implementation of the arrangement for operating the temporary line store 118 as a signed accumulator for GCR signals, a digital adder/subtractor 119 supplies a 16-parallel-bit output signal to the temporary line store 118 as its write input signal. The digital adder/subtractor 119 receives as a first input thereto the output signal of a multiplexer 120, which normally corresponds to the readout from the temporary line store 118 received as the zeroeth input of the multiplexer 120. The digital adder/subtractor 119 receives as a second input thereto the 8-parallel-bit output signal of the multiplexer 117, together with eight wired ZEROs as a sign-bit extension.

A decoder 121 decodes the MODULO-8 FIELD COUNT being one, three, six, or zero (i.e., eight) to furnish a logic ZERO to the digital adder/subtractor 119 to condition it to add its input signals. The decoder 121 decodes the MODULO-8 FIELD COUNT being two, four, five, or seven to furnish a logic ONE to the digital adder/subtractor 119 to condition it subtract its second input signal (supplied from the multiplexer 117) from its first input signal (supplied from the multiplexer 120). This arrangement accumulates in the temporary line store 118 the following function:

(FIELD 001 line 19) − (FIELD 010 line 19)
+ (FIELD 011 line 19) − (FIELD 100 line 19)

-continued

− (FIELD 101 line 19) + (FIELD 110 line 19)
− (FIELD 111 line 19) + (FIELD 000 line 19).

When each frame of data is transmitted twice, being transmitted a first time in a first logic sense during an odd-numbered one of consecutively numbered frames of the NTSC television signal, and being transmitted a second time in a second sense opposite the first during the next even-numbered one of those frames, the data will average to zero in the final accumulation. When each frame of data is transmitted but once, data transmission may be discontinued during the $19^{th}$ scan line of each field, so that the result of accumulating GCR signals will not be affected by the data.

During the last line of the eighth field of each sequence of eight fields, the normally ZERO control signal to the multiplexer 120 is caused to be a ONE. This ONE conditions the multiplexer 120 to furnish an output signal corresponding to a first input thereto, which is an arithmetic zero comprising sixteen parallel bits of wired ZEROs. This results in the resetting of the accumulation result in the temporary line store 118 to arithmetic zero. The control signal for the multiplexer 120 is shown in FIG. 2 as being generated by a two-input AND gate 122. The decoder 143 generates one of the input signals to the AND gate 122, supplying a ONE to the AND gate 122 when and only when the DATA ROW COUNT corresponds to a video signal scan line count that is 262. A decoder 123 decodes the MODULO-8 FIELD COUNT from the field counter 113 to generate the other of the input signals to the AND gate 122. The eighth field of each sequence of eight fields generates a 000 MODULO-8 FIELD COUNT from the field counter 113, causing the decoder 123 to supply a ONE to the AND gate 122. Both the input signals to the AND gate 122 are ONE only during the last line of the eighth field of each sequence of eight fields, during which line the AND gate 122 supplies a ONE to the multiplexer 120 as its control signal, causing the accumulation result stored in the temporary line store 118 to be reset to arithmetic zero.

A two-input AND gate 124 supplies a ONE to the filter-coefficient computer 112 when the accumulation result stored in the temporary line store 118 is available for transfer into a ghosted Bessel-chirp register within the internal memory of the computer 112. The output signal of the decoder 123 is one of the input signals to the AND gate 124 and is ONE only during the eighth field of each sequence of eight fields. The decoder 125 decodes DATA ROW COUNT to generate the other of the input signals to the AND gate 124, which is ONE during the video scan lines 20 through 261. Accordingly, the accumulation result stored in the temporary line store 118 is available for transfer into the internal memory of the computer 112 any time during the period including scan lines 20 through 261 in the eighth field of each sequence of eight fields.

In actual practice, it is preferable that the temporary line store 118 stores about two scan lines of samples, so that the deghosting range for post ghosts can be extended to 20 microseconds or so. The storage locations in the RAM used as the temporary line store 118 can be addressed by the least significant bit of DATA ROW COUNT together with the SYMBOL-PER-DATA-ROW COUNT. The decoder 114 is replaced by a decoder that generates a ONE when and only when DATA ROW COUNT is either 19 or 20, and the decoder 115 is replaced by a decoder that generates a ONE when and only when DATA ROW COUNT corresponds to a video scan line count of either 251 or 252. To improve the signal-to-noise ratio of the recovered GCR signal it is advantageous to average the GCR signal not over just eight scan lines 19, but over sixteen (or even higher multiple of eight) scan lines 19. This can be done by modifying the line-19 accumulation circuitry of FIG. 2 or by arranging for the further averaging to be done in the computer 112.

FIG. 3 shows circuitry for resetting the modulo-eight field counter 113 so its count either is correctly phased or is misphased by four fields. A temporary line store 126 is shown as being a random-access memory addressed by the SYMBOL-PER-DATA-ROW COUNT from the counter 53. The line store 126 is arranged for read-then-write-over operation. The logic ONE issued by the OR gate 116 only during the $19^{th}$ scan line of each field is furnished to a multiplexer 127 to condition the updating of the temporary line store 126 with digitized $19^{th}$ scan line samples supplied from the ADC 104. During other scan lines the logic ZERO issued by the OR gate 116 conditions the multiplexer 127 to apply the data read from the temporary line store 126 for writing back thereinto.

The temporary line store 126 is provided with pixel latches 128 and 129 clocked by the output signal from the zero-crossing detector 56 (which clocking connections are not shown in FIG. 3). The pixel latches 128 and 129 are used for temporarily storing the last pixel written into the temporary line store 126 and the last pixel read out of the temporary line store 126, respectively, aligning those samples in time to be respective ones of the subtrahend and minuend input signals of a digital subtractor 130. The pixel samples of the difference signal from the subtractor 130 will all be zero valued except during $19^{th}$ scan lines. The difference signal from the subtractor 130 is furnished to an absolute-value circuit 131. By way of example, the absolute-value circuit 131 comprises a digital controlled adder/subtractor receiving wired arithmetic zero as its summand/minuend input signal, receiving the difference signal from the subtractor 130 as its summand/subtrahend input signal, and responding to the sign bit of that difference signal to add when that bit is ZERO and to subtract when it is ONE.

An accumulator 132 for successive samples of the absolute-value circuit 131 output signal includes an output latch 133 for temporarily storing successive values of the accumulation result, a digital adder 134 for adding the successive samples of the output signal of the absolute-value circuit 131 to the accumulation result to augment its value, and a multiplexer 135 for selectively supplying the augmented accumulation result to the output latch 133 for updating its contents. The multiplexer 135 is wired for inserting arithmetic zero into the output latch 133 whenever the OR gate 116 does not furnish a ONE which ONE indicates that GCR signal is present in the current scan line. A decoder 136 responds to the SYMBOL-PER-DATA-ROW COUNT from the counter 53 being descriptive of those portions of a scan line as may contain Bessel chirp information to furnish a ONE, which is ANDed with the output signal from the zero-crossing detector 56 in an AND gate 137. The output latch 133 is clocked to receive input data responsive only to a ONE being received from the AND gate 137.

The successive samples of the absolute value of the difference of the nineteen lines of the current and previous fields, as supplied serially from the absolute-value circuit 131, are accumulated using the accumulator 132. The accumulation result should have appreciable value if the current field is not FIELD 001 or FIELD 101. The $19^{th}$ lines of FIELD 000 and of FIELD 001 both contain ETP signal, so their difference is zero-valued except for noise. The $19^{th}$ lines of FIELD 100 and of FIELD 101 both contain ETR signal, so their difference is zero-valued except for noise. The output signal of a threshold detector 138, which is a ONE when the accumulation result is substantially more than arithmetic zero and is otherwise a ZERO, is complemented by a NOT gate 139 to supply one of the four input signals of an AND gate 140. A decoder 141 detects the field count from the counter 113 being other than 001 or 101 to furnish a ONE to the AND gate, which ONE is indicative that the field count is misphased and enables the resetting of the counter 113. The output signal of the OR gate 116, which detects the occurrence of the $19^{th}$ line of a field, and the output signal of a decoder 142, which responds to the SYMBOL-PER-DATA-ROW COUNT from the counter 53 to detect the end of a scan line, are the other two input signals to the AND gate 140. Providing that the field count is not 001 or 101, the AND gate 140 generates a ONE to reset the counter 113 to 001 field count at the end of the $19^{th}$ line of a FIELD 000 or of a FIELD 100 in the composite video signal detected by the in-phase video detector 49.

Returning to FIG. 2, if the modulo-eight field count provided by the field counter 113 is correctly phased, the accumulation result attained in the temporary line store 118 during FIELD 000, the last field in the cycle of algebraic accumulation, will be eight times the ETP Bessel chirp signal, devoid of accompanying horizontal sync pulse, front porch, back porch including color burst and +30 IRE pedestal. On the other hand, if the modulo-eight field count provided by the field counter 113 is misphased by four fields, the accumulation result attained in the temporary line store 118 during FIELD 000, the last field in the cycle of accumulation will be eight times the ETR Bessel chirp signal devoid of accompanying horizontal sync pulse, front porch, back porch including color burst and +30 IRE pedestal. A wired three binary place shift in the direction towards reduced magnitude divides the accumulation results attained in the temporary line store 118 during FIELD 000 by eight, and the resulting quotients are supplied as the ETP or ETR signal to the filter-coefficient computer 112.

The filter-coefficient computer 112, which is well-adapted to performing correlations against a ghost-free Bessel chirp function ETP or ETR stored in an internal register thereof, is programmed to perform a correlation substep that determines whether the input it receives from the temporary line store 118 during FIELD 000 is ETP signal, is ETR signal, or is unrelated to the ETP or ETR signal. This procedure enables the filter-coefficient computer 112 to determine when no GCR signals are included in the composite video signal detected by the in-phase video detector 49. The computer 112 may then apply predetermined "bypass-mode" weighting coefficients as stored in registers therewithin to the filters 105, 106 and 107, just as is done in the initial powering up of the ghost-suppression circuitry.

The ghost-suppression circuitry in FIGS. 2 and 3 is described and claimed by Chandrakant B. Patel and Jian Yang in U.S. patent application Ser. No. 07/984,488 filed 2 Dec. 1992, entitled "GHOST CANCELATION REFERENCE SIGNAL ACQUISITION CIRCUITRY, AS FOR TV RECEIVER OR VIDEO RECORDER", and assigned to Samsung Electronics, Co., Ltd., pursuant to pre-existing obligations of the inventors to so assign their inventions at the time the inventions were made. This application is incorporated by reference for its detailed disclosure of the method of computing the filtering parameters for filters in the ghost-suppression circuitry in FIGS. 2 and 3. The method of computing the filtering parameters for filters in that circuitry is more generally described by Chandrakant B. Patel and Jian Yang in allowed U.S. patent application Ser. No. 07/984,488 filed 2 Dec. 1992, entitled "GHOST CANCELATION REFERENCE SIGNAL ACQUISITION CIRCUITRY, AS FOR TV RECEIVER OR VIDEO RECORDER", and assigned to Samsung Electronics, Co., Ltd., pursuant to pre-existing obligations of the inventors to so assign their inventions at the time the inventions were made. Rather than adjusting the delay of adjustable delay line 58 responsive to detection procedures carried out in the elements 64–67 of FIG. 1, the delay may be adjusted as part of the ghost cancellation procedure.

Figure 4:
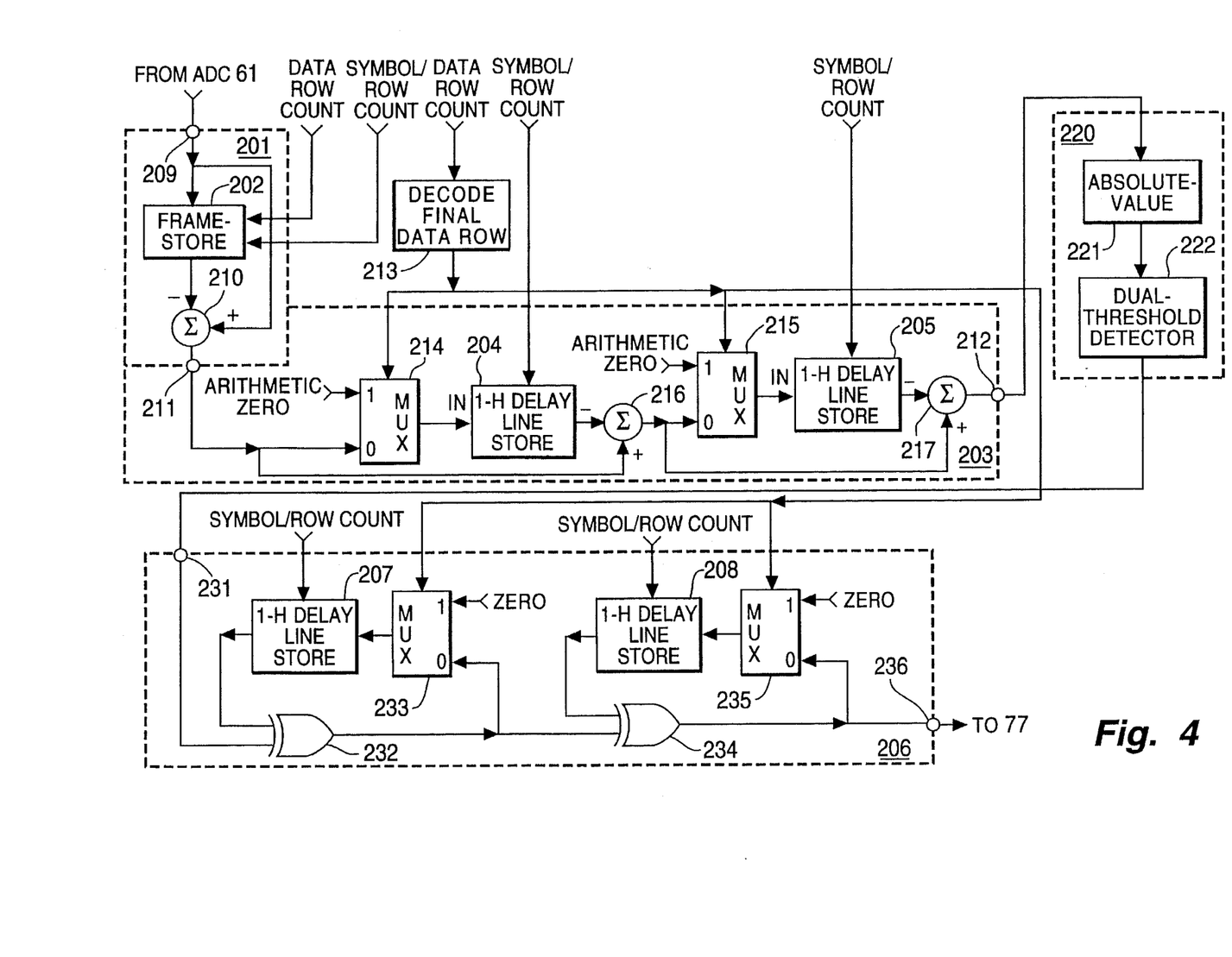
FIG. 4 is a schematic diagram of a representative form the data separation and detection circuitry of FIG. 1 can take.

FIG. 4 shows one particular form 200 that the data separation and detection circuitry 76 of FIG. 1 can take, which form is described in U.S. patent application Ser. No. 08/179,588 filed 5 Jan. 1994. This particular data separation and detection circuitry 200 illustrates an aspect of the invention wherein a frame-comb filter 201 responsive to the digitized samples supplied from the ADC 61 includes a digital framestore 202 that is random access memory addressed by the SYMBOL PER ROW and DATA ROW counts supplied by the counters 53 and 72 of FIG. 1. The FIG. 4 circuitry 200 further illustrates an aspect of the invention wherein a line-comb filter 203 responsive to the digitized samples supplied from the ADC 61 includes digital linestores 204 and 205 that are random access memories addressed by the SYMBOL PER ROW count from the counter 53 of FIG. 1. The FIG. 4 circuitry 200 still further illustrates an aspect of the invention wherein a post-line-comb partial-response filter 206 responsive to the digitized samples supplied from the ADC 61 includes digital linestores 207 and 208 that are random access memories addressed by the SYMBOL PER ROW count from the counter 53 of FIG. 1.

More particularly, an input terminal 209 of the frame-comb filter 201 receives digital samples directly from the ADC 61 for application to the minuend input of a digital subtractor 210 and to the input of the digital framestore 202. Digital samples read from the output of the digital framestore 202 are applied as the subtrahend input of the digital subtractor 210. The framestore 202 is a RAM operated in a read-and-then-write-over mode, which RAM is addressed by a DATA ROW COUNT supplied from the counter 72 applied as row address and the SYMBOL PER ROW COUNT from the counter 52 applied as column address. The samples stored at each addressable storage location in the digital framestore 202 typically have at least twelve bits in them. The subtractor 210 and the framestore 202 together form a highpass frame-comb filter 201, supplying from the output of the subtractor 210 to a terminal 211 a highpass frame-comb filter response to the digital samples received at the input terminal 209, in which response luma components descriptive of static image are suppressed.

The terminal 211 serves not only as the output terminal for the highpass frame-comb filter 201, but also as the input terminal for the highpass line-comb filter 203, receiving the highpass frame-comb filter response and suppressing luma components descriptive of moving image in its response supplied at the output terminal 212 of the data separation filtering. Luma components are suppressed in the response supplied at the output terminal 212, which is primarily constituted of highpass comb-filtered digital signal samples of 5-level form.

The decoder 213, which responds to DATA ROW COUNT, generates a logic ONE as output signal when the DATA ROW COUNT indicates that the final row of the data frame has been reached and generates a logic ZERO as output signal at all other times. The output signal of the decoder 213 is supplied as control signal to multiplexers 214 and 215, each of which multiplexers has a respective first input receptive of wired arithmetic zero and has a respective second input. The multiplexers 214 and 215 have respective outputs respectively connected to the respective write inputs of digital linestores 204 and 205, which are RAMs operated as 1-H delay lines. The output signal of a 1-H delay line reproduces the input signal applied thereto after a delay equal to the duration of a horizontal scanning line of the composite video signal (63.5 microseconds). The 1-H delay lines 204 and 205 are respective RAMs addressed by the SYMBOL PER ROW COUNT from the symbol counter 52 and operated in a read-then-write-over mode. The logic ONE furnished as output signal from the decoder 213 during the final row of each data frame conditions the multiplexers 214 and 215 to write a respective row of arithmetic-zero samples into each of the 1-H delay lines 204 and 205. Consequently, rows of arithmetic-zero samples are read from the 1-H delay lines 204 and 205 during the initial row of each data frame, which is done so that the post-line-comb partial-response filter 206 can be appropriately reset.

A logic ZERO is furnished as output signal from the decoder 213 during normal operation of the highpass line-comb filter 206. Responsive to the logic ZERO supplied as a control signal from the decoder 213, the multiplexer 214 replicates, in its output signal supplied to the input of the 1-H digital delay line 204, the highpass frame-comb filter response applied to the second input of the multiplexer 214 via the terminal 211. Responsive to the logic ZERO supplied as a control signal from the decoder 213, the multiplexer 215 replicates, in its output signal supplied to the input of the 1-H digital delay line 205 the difference output signal from a digital subtractor 216. The subtractor 216 combines the highpass frame-comb filter response and that response as delayed by the duration of one horizontal scan line; and a digital subtractor 217 combines the difference output signal from the subtractor 216 and that difference output signal as delayed by the duration of one horizontal scan line, thereby to generate at the output terminal 212 a highpass line-comb filter response to the highpass frame-comb filter response supplied to the terminal 211 from the output of the subtractor 210.

The line-comb filter 203 converts the BPSK signal to 5-level digital information, rather than leaving it in binary form. Symbol decision circuitry 220 in such case has five comparator ranges respectively centered on −2, −1, 0, +1, and +2. Symbol decision circuitry 220 includes an absolute-value circuit 221, which generates a rectified digital response to the output signal from the data separation filter 203. The rectified digital response of the absolute-value circuit 221 is descriptive of ternary (or 3-level) keying signal superposed on a direct-voltage pedestal, rather than being descriptive of binary coding of keying signal, so this rectified digital response is supplied to a double-threshold detector 222. The double-threshold threshold detector 222 receives the symbol stream from absolute-value circuit 221 and makes a decision as to whether the symbol is most likely a ZERO, is most likely a ONE, or is most likely a TWO, TWOs being equated to ZEROs. The double-threshold threshold detector 222 typically contains two digital comparators (each arranged to operate as single-threshold detector, the second of these single-threshold detectors being operated at a threshold digital value twice as large as the threshold digital value the first of them is operated at) and some simple logic circuitry for deciding the identity of the symbol depending on the threshold detection results. If neither of the threshold digital values is exceeded, or if both of the threshold digital values is exceeded, the logic circuitry indicates that the symbol is most likely a ZERO. If only the lower threshold digital value is exceeded, the logic circuitry indicates that the symbol is most likely a ONE. The double-threshold threshold detector 222 is preferably of a type in which the digital values supplied to the comparators for determining the thresholds for threshold detection are automatically adjusted responsive to symbol strength. In such case, the double-threshold threshold detector 222 has associated circuitry for detecting the average level of the symbol stream supplied by absolute-value circuit 221, or its average peak level, or both. There is circuitry for reckoning from each level detected the digital values supplied to the digital comparators to establish their respective thresholds for threshold detection. The detection procedures for determining symbol decision thresholds preferably are selectively implemented during the vertical blanking intervals, when the composite video signal contributes almost no energy to the signal detected by the quadrature-phase video detector 47.

The bit-serial signal from the double-threshold threshold detector 222 is applied via an input terminal 231 of the partial-response filter 206 to a first input of a two-input exclusive-OR (XOR) gate 232. A two-input multiplexer 233 has a first input to which a wired ZERO is applied, has a second input to which the response of the XOR gate 232 is applied, and has an output connected to the input of a 1-H digital delay line 207. The digital delay line 207 supplies at its output connection to the second input of the XOR gate 232 a response to the output signal from the multiplexer 233 delayed by the duration of one horizontal scan line. The elements 232, 233 and 207 provide an initial section of the post-line-comb partial-response filter 206; and the elements 234, 235 and 208 provide a final section of the post-line-comb partial-response filter 206. The two-input exclusive-OR gate 234 has a first input to which the output of XOR gate 232 is connected for applying the response of the initial section of the pre-line-comb partial-response filtering. A two-input multiplexer 235 has a first input to which a wired ZERO is applied, has a second input to which the response of the XOR gate 234 is applied, and has an output connected to the input of a 1-H digital delay line 208. The digital delay line 208 supplies at its output connection to the second input of the XOR gate 207 a response to the output signal from the multiplexer 235 delayed by the duration of one horizontal scan line. Each of the multiplexers 233 and 235 receives the output signal from the decoder 213 as its control signal.

The output signal of the decoder 213 is a ONE only during the final row of each data frame, conditioning the multiplexers 214 and 215 to load arithmetic-zero samples into the 1-H digital delay lines 204 and 205 in the data separation filter 203, and conditioning the multiplexers 233 and 235 in the partial-response filter 206 to load logic-ZERO samples into the 1-H digital delay lines 207 and 208. These procedures allow the contents of the 1-H digital delay lines 207 and 208 in the post-line-comb partial-response filter to be periodically initialized, in synchronization with the initialization of the contents of the 1-H digital delay lines 204 and 205 in the highpass line-comb filter portions of the data separation filter 203. Since this periodic initialization is done during the vertical blanking interval, there are no appreciable remnants of the NTSC video signal to act as a jamming signal. This is so even during the horizontal blanking interval, since the data frames begin and end during scan lines when color burst is not transmitted, and since the quadrature-phase video detector 47 suppresses remnants of the NTSC video signal below 750 kHz at all times, eliminating synchronizing and equalizing pulses as jamming signal.

The response of the final section of the post-line-comb partial-response filter comprising the elements 208, 234 and 235 appears at the output of the XOR gate 234 and is applied to the output terminal 236 of the partial response filter 206. Because of the data frames being repeated, there is no need for a post-frame-comb partial response filter.

The order of the frame-comb filter 201 and line-comb filter 203 can be reversed from that shown in FIG. 4. U.S. patent application Ser. No. 08/179,588 filed 5 Jan. 1994 shows variants of the FIG. 4 circuitry wherein resetting procedures concerning the line-comb filter 203 and post-line-comb partial response filter 206 are carried out at the time the occurrence of the initial data row is decoded. This is accommodated by relocating the multiplexers 214, 215, 233 and 235 to follow, rather than precede, the 1-H delay linestores 204, 205, 207 and 208.

While the invention has been described with particular reference to receivers for recovering digital signals buried in analog television signals, it has application in analogous systems. For example, it is useful in systems for analog tape recording using folded-spectrum luminance signals of the sort described in U.S. Pat. No. 5,113,262 issued 12 May 1992 to C. H. Strolle et alii and entitled VIDEO SIGNAL RECORDING SYSTEM ENABLING LIMITED BANDWIDTH RECORDING AND PLAYBACK. In such a system the data is encoded in the same frequency modulated luma carrier as the horizontal sync pulses are, rather than being encoded in sidebands of a video carrier orthogonal to the sidebands descriptive of modulation of the video carrier by the horizontal sync pulses. The invention is also useful in systems, such as high-definition television systems, where the data row synchronization signals or line synchronization signals take the form of a recognizable code group rather than synchronizing pulses. The data row synchronization signals or line synchronization signals are detected using a matched filter and used as an input signal for the AFPC circuit.

When the invention is embodied within systems other than those for burying PSK signals in NTSC analog television signals, the bit-resolution requirements on the analog-to-digital converters are likely to be more modest, so oversampling during analog-to-digital conversion can be avoided. In such case the output signal of the controlled oscillator or of a zero-crossing detector thereafter can be used directly to time the sampling of video detector response by the analog-to-digital converter; and the sample-per-symbol counter and symbol-per-line counters are replaced by a single, sample-per-line counter.

What is claimed is:

1. In a digital signal receiver receptive of a received signal including row synchronization signals occurring at a row rate and including analog signal representative of digital data having a symbol rate that is a multiple of row rate, clock regeneration circuitry comprising:

a controlled oscillator for generating oscillations at a frequency that is controlled in response to an automatic-frequency-and-phase-control signal and that can be controlled to be a multiple of said symbol rate;

a frequency divider for dividing the frequency of the oscillations of said controlled oscillator by a factor equal to the number of said oscillations that are supposed to occur between corresponding points in consecutive row synchronization signals, to generate an automatic-frequency-and-phase-control feedback signal;

means, responsive to said received signal, for detecting the occurrence of said row synchronization signals in said received signal to generate line synchronization pulses;

a controlled delay line for delaying said line synchronization pulses in amount controlled by a delay control signal, thereby to provide delayed line synchronization pulses;

an automatic-frequency-and-phase-control detector for generating said automatic-frequency-and-phase-control signal responsive to differences in the respective frequencies and respective phases of said automatic-frequency-and-phase-control feedback signal and of said delayed line synchronization pulses, thereby completing a first feedback loop for applying automatic-frequency-and-phase-control signal to said controlled oscillator;

an analog-to-digital converter responsive to the oscillations of said controlled oscillator for sampling and digitizing said analog signal representative of digital data, thereby to generate at said symbol rate digitized signal samples representative of said digital data; and means for determining sampling phase error in said digitized signal samples generated at said symbol rate, thereby to generate said delay control signal applied to said controlled delay line for completing a supplementary feedback loop for adjusting the sampling phase in said digitized signal samples to minimize inter-symbol interference.

2. Clock regeneration circuitry as set forth in claim 1; wherein said analog-to-digital converter is of an oversampling type, sampling said analog signal representative of digital data in accordance with a first clock signal supplied at an oversampling rate that is at least a two times multiple of said symbol rate, and supplying said digitized signal samples at said symbol rate in accordance with a second clock signal; and wherein said frequency divider includes:

a zero-crossing detector for generating said first clock signal responsive to the oscillations of said controlled oscillator, a first counter counting occurrences of said first clock signal for generating a first count signal and said second clock signal, each occurrence of said second clock signal corresponding to said first count signal attaining a value indicative of the prescribed number of samples per symbol period, said first count signal thereafter being returned to an initial value thereof;

a second counter counting occurrences of said second clock signal in each row or line period for generating a second count signal, means detecting each time said second count signal reaches a value indicative of the prescribed number of symbols per row for generating a third clock signal applied to said automatic-frequency-and-phase-control detector as said automatic-frequency-and-phase-control feedback signal, and means applying said third clock signal to said second counter for resetting said second count signal to an initial value thereof.

3. Clock regeneration circuitry as set forth in claim 2 further comprising:

a third counter counting occurrences of said third clock signal in each row or line period for generating a third count signal and a fourth clock signal, respective occurrences of said fourth clock signal corresponding to said third count signal attaining a value indicative of the prescribed number of rows or lines per frame, said third count signal thereafter being returned to an initial value thereof.

4. Clock regeneration circuitry as set forth in claim 3 further comprising:

a fourth counter counting occurrences of said second clock signal for generating a fourth count signal and a fifth clock signal, each occurrence of said fifth clock signal corresponding to said fourth count signal attaining a value indicative of a prescribed number of symbols per column, said fourth count signal thereafter being returned to an initial value thereof; and, a fifth counter counting occurrences of said fifth clock signal in each line period for generating a fifth count signal.

5. Clock regeneration circuitry as set forth in claim 4 included in said digital signal receiver in combination with:

means responding to each sample from said analog-to-digital converter for deciding a symbol value described by that sample, thereby to regenerate a respective symbol indication; and a deinterleaver for said symbol indications including random-access memory receiving said second count signal and said third count signal as write address signals and receiving said fourth count signal and said fifth count signal as read address signals.

6. Clock regeneration circuitry as set forth in claim 4 included in said digital signal receiver in combination with:

a ghost suppression filter receptive of samples from said analog-to-digital converter for supplying de-ghosted samples;

means responding to each de-ghosted sample for deciding a symbol value described by that sample, thereby to regenerate a respective symbol indication; and a deinterleaver for said symbol indications including random-access memory receiving said second count signal and said third count signal as write address signals and receiving said fourth count signal and said fifth count signal as read address signals.

7. Clock regeneration circuitry as set forth in claim 1, wherein said frequency divider includes:

a first counter counting occurrences of the oscillations of said controlled oscillator for generating a first count signal;

means detecting each time said first count signal reaches a value indicative of the prescribed number of the oscillations of said controlled oscillator per line for generating a first clock signal applied to said automatic-frequency-and-phase-control detector as said automatic-frequency-and-phase-control feedback signal; and means applying said first clock signal to said first counter for resetting said first count signal to an initial value thereof.

8. Clock regeneration circuitry as set forth in claim 7 further comprising:

a second counter counting occurrences of said first clock signal for generating a second count signal and a second clock signal, respective occurrences of said second clock signal corresponding to said second count signal attaining a value indicative of the prescribed number of rows or lines per frame, said second count signal thereafter being returned to an initial value thereof.

9. Clock regeneration circuitry as set forth in claim 8 further comprising:

a third counter counting occurrences of the oscillations of said controlled oscillator for generating a third count signal and a third clock signal, respective occurrences of said third clock signal corresponding to said third count signal attaining a value indicative of the prescribed number of symbols per column, said third count signal thereafter being returned to an initial value thereof; and a fourth counter counting occurrences of said third clock signal in each line period for generating a fourth count signal indicative of a data column within a data frame.

10. Clock regeneration circuitry as set forth in claim 9 included in said digital signal receiver in combination with:

means responding to each sample from said analog-to-digital converter for deciding a symbol value described by that sample, thereby to regenerate a respective symbol indication; and a deinterleaver for said symbol indications including random-access memory receiving said first count signal and said second count signal as write address signals and receiving said third count signal and said fourth count signal as read address signals.

11. Clock regeneration circuitry as set forth in claim 9 included in said digital signal receiver in combination with:

a ghost suppression filter receptive of samples from said analog-to-digital converter for supplying de-ghosted samples;

means responding to each de-ghosted sample for deciding a symbol value described by that sample, thereby to regenerate a respective symbol indication; and a deinterleaver for said symbol indications including random-access memory receiving said first count signal and said second count signal as write address signals and receiving said third count signal and said fourth count signal as read address signals.

12. Clock regeneration circuitry as set forth in claim 1 wherein said row synchronization signals consist of line synchronizing pulses included together with said analog signal representative of digital data in said received signal.

13. In a digital signal receiver receptive of a received signal including line synchronization pulses occurring at a line rate and including analog signal representative of digital data having a symbol rate that is a multiple of line rate, clock regeneration circuitry comprising:

a controlled oscillator for generating oscillations at a frequency that is controlled in response to an automatic-frequency-and-phase-control signal and that can be controlled to be a multiple of said symbol rate;

a frequency divider for dividing the frequency of the oscillations of said controlled oscillator by a factor equal to the number of said oscillations that are supposed to occur between corresponding points in consecutive line synchronization pulses, to generate an automatic-frequency-and-phase-control feedback signal;

means for separating said line synchronization pulses from said received signal to provide separated line synchronization pulses;

a controlled delay line for delaying said separated line synchronization pulses in amount controlled by a delay control signal, thereby to provide delayed line synchronization pulses;

an automatic-frequency-and-phase-control detector for generating said automatic-frequency-and-phase-control signal responsive to differences in the respective frequencies and respective phases of said automatic-frequency-and-phase-control feedback signal and of said delayed line synchronization pulses, thereby completing a first feedback loop for applying automatic-frequency-and-phase-control signal to said controlled oscillator;

a first analog-to-digital converter responsive to the oscillations of said controlled oscillator for sampling and digitizing said analog signal representative of digital data, thereby to generate at said symbol rate digitized signal samples representative of said digital data; and means for determining sampling phase error in said digitized signal samples generated at said symbol rate, thereby to generate said delay control signal applied to said controlled delay line for completing a supplementary feedback loop for adjusting the sampling phase in said digitized signal samples to minimize inter-symbol interference.

14. Clock regeneration circuitry as set forth in claim 13; wherein said first analog-to-digital converter is of an oversampling type, sampling said analog signal representative of digital data in accordance with a first clock signal supplied at an oversampling rate that is at least a two times multiple of said symbol rate, and supplying said digitized signal samples at said symbol rate in accordance with a second clock signal; and wherein said frequency divider includes:

a zero-crossing detector for generating said first clock signal responsive to the oscillations of said controlled oscillator, a first counter counting occurrences of said first clock signal for generating a first count signal and said second clock signal, each occurrence of said second clock signal corresponding to said first count signal attaining a value indicative of the prescribed number of samples per symbol period, said first count signal thereafter being returned to an initial value thereof;

a second counter counting occurrences of said second clock signal in each line period for generating a second count signal, means detecting each time said second count signal reaches a value indicative of the prescribed number of symbols per line for generating a third clock signal applied to said automatic-frequency-and-phase-control detector as said automatic-frequency-and-phase-control feedback signal, and means applying said third clock signal to said second counter for resetting said second count signal to an initial value thereof.

15. Clock regeneration circuitry as set forth in claim 13 included in said digital signal receiver together with:

a line-comb filter responsive to said digitized signal samples representative of said digital data, as generated at said symbol rate by said first analog-to-digital converter, said line-comb filter including at least one line-store memory addressed by said second count signal.

16. Clock regeneration circuitry as set forth in claim 13 included in said digital signal receiver together with:

a ghost suppression filter responsive to said digitized signal samples representative of said digital data, as generated at said symbol rate by said first analog-to-digital converter, for supplying respective de-ghosted samples;

a line-comb filter responsive to said de-ghosted samples, said line-comb filter including at least one line-store memory addressed by said second count signal.

17. Clock regeneration circuitry as set forth in claim 14 included in said digital signal receiver together with:

a third counter counting occurrences of said third clock signal in each line period for generating a third count signal, and a fourth clock signal, respective occurrences of said fourth clock signal corresponding to said third count signal attaining a value indicative of the prescribed number of rows or lines per frame, said third count signal thereafter being returned to an initial value thereof.

18. Clock regeneration circuitry as set forth in claim 14 included in said digital signal receiver together with:

a third counter counting occurrences of said third clock signal in each line period for generating a third count signal and a fourth clock signal, respective occurrences of said fourth clock signal corresponding to said third count signal attaining a value indicative of the prescribed number of rows or lines per frame, said third count signal thereafter being returned to an initial value thereof; and a frame-comb filter responsive to said digitized signal samples representative of said digital data, as generated at said symbol rate by said first analog-to-digital converter, said frame-comb filter including at least one frame-store memory addressed by said second and third count signals.

19. Clock regeneration circuitry as set forth in claim 14 included in said digital signal receiver together with:

a ghost suppression filter responsive to said digitized signal samples representative of said digital data, as generated at said symbol rate by said first analog-to-digital converter, for supplying respective de-ghosted samples;

a third counter counting occurrences of said third clock signal in each line period for generating a third count signal and a fourth clock signal, respective occurrences of said fourth clock signal corresponding to said third count signal attaining a value indicative of the prescribed number of rows or lines per frame, said third count signal thereafter being returned to an initial value thereof; and a frame-comb filter responsive to said de-ghosted samples, said frame-comb filter including at least one frame-store memory addressed by said second and third count signals.

20. Clock regeneration circuitry as set forth in claim 13, wherein said frequency divider includes:

a first counter counting occurrences of the oscillations of said controlled oscillator for generating a first count signal;

means detecting each time said first count signal reaches a value indicative of the prescribed number of the oscillations of said controlled oscillator per line for generating a first clock signal applied to said automatic-frequency-and-phase-control detector as said automatic-frequency-and-phase-control feedback signal; and means applying said first clock signal to said first counter for resetting said first count signal to an initial value thereof.

21. Clock regeneration circuitry as set forth in claim 20 included in said digital signal receiver together with:

a line-comb filter responsive to said digitized signal samples representative of said digital data, as generated at said symbol rate by said first analog-to-digital converter, said line-comb filter including at least one line-store memory addressed by said first count signal.

22. Clock regeneration circuitry as set forth in claim 21 included in said digital signal receiver together with:

a ghost suppression filter responsive to said digitized signal samples representative of said digital data, as generated at said symbol rate by said first analog-to-digital converter, for supplying respective de-ghosted samples;

a line-comb filter responsive to said de-ghosted samples, said line-comb filter including at least one line-store memory addressed by said first count signal.

23. Clock regeneration circuitry as set forth in claim 20 further comprising:

a second counter counting occurrences of said first clock signal for generating a second count signal and a second clock signal, respective occurrences of said second clock signal corresponding to said second count signal attaining a value indicative of the prescribed number of rows or lines per frame, said second count signal thereafter being returned to an initial value thereof.

24. Clock regeneration circuitry as set forth in claim 23 included in said digital signal receiver together with:

a frame-comb filter responsive to said digitized signal samples representative of said digital data, as generated at said symbol rate by said first analog-to-digital converter, said frame-comb filter including at least one frame-store memory addressed by said first and second count signals.

25. Clock regeneration circuitry as set forth in claim 23 included in said digital signal receiver together with:

a ghost suppression filter responsive to said digitized signal samples representative of said digital data, as generated at said symbol rate by said first analog-to-digital converter, for supplying respective de-ghosted samples; and a frame-comb filter responsive to said de-ghosted samples, said frame-comb filter including at least one frame-store memory addressed by said first and second count signals.

\* \* \* \* \*